May 31, 1932.    N. M. MARSILIUS ET AL    1,860,840
MILLING MACHINE
Filed Nov. 30, 1927    5 Sheets-Sheet 1

INVENTOR.
Newman M. Marsilius
and Oswald A. Olsen
ATTORNEYS.
Chamberlain & Newman

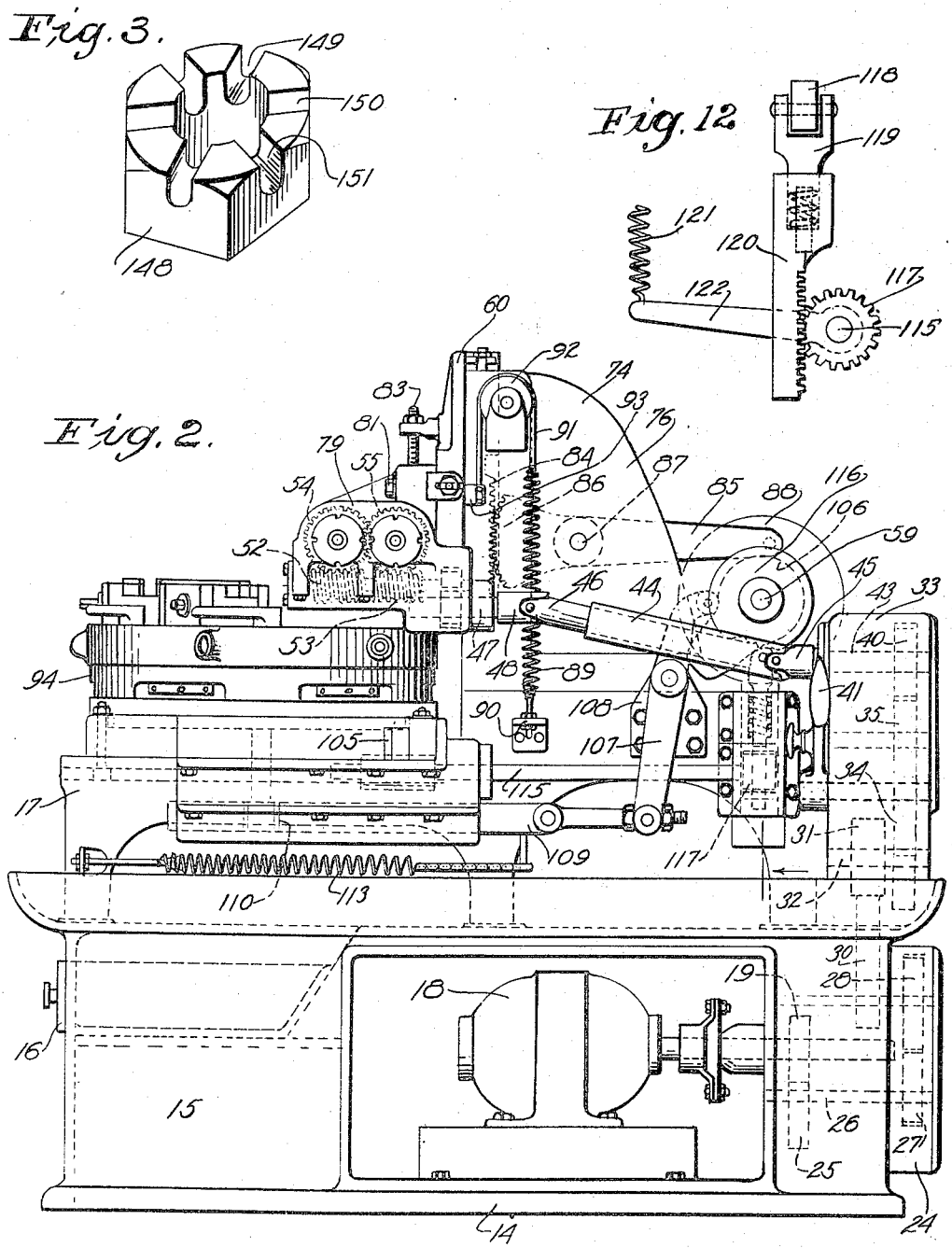

May 31, 1932.  N. M. MARSILIUS ET AL  1,860,840
MILLING MACHINE
Filed Nov. 30, 1927   5 Sheets-Sheet 3

INVENTOR.
Newman M. Marsilius
and Oswald A. Olsen
ATTORNEYS.
Chamberlain & Newman

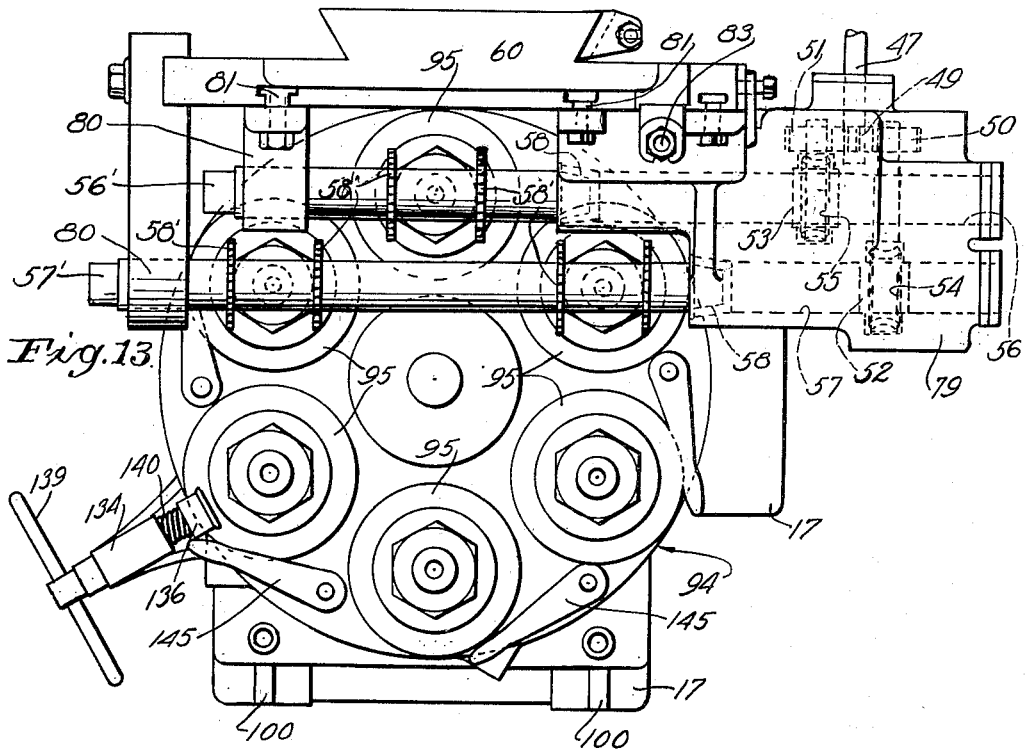
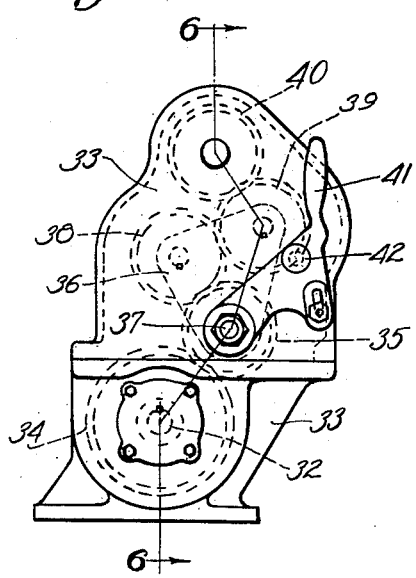
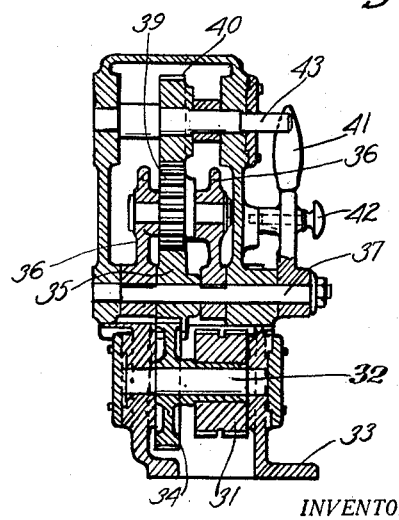

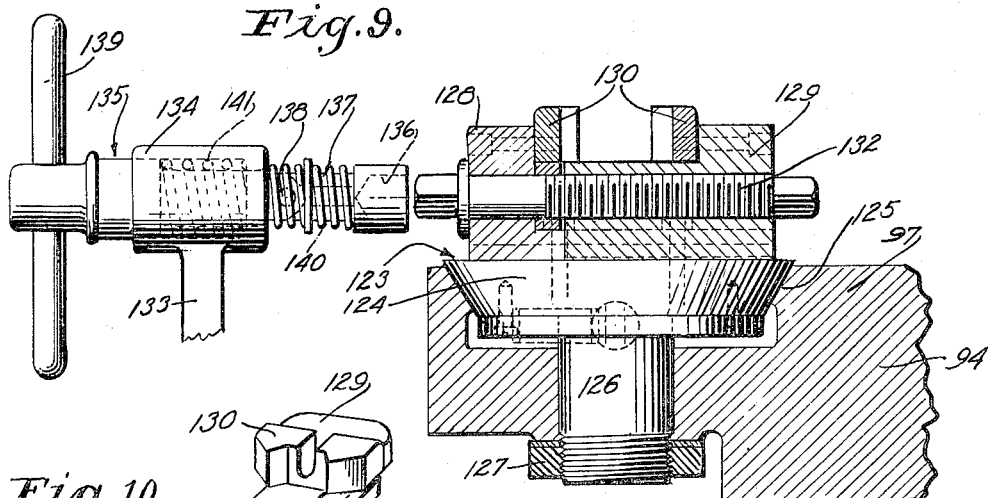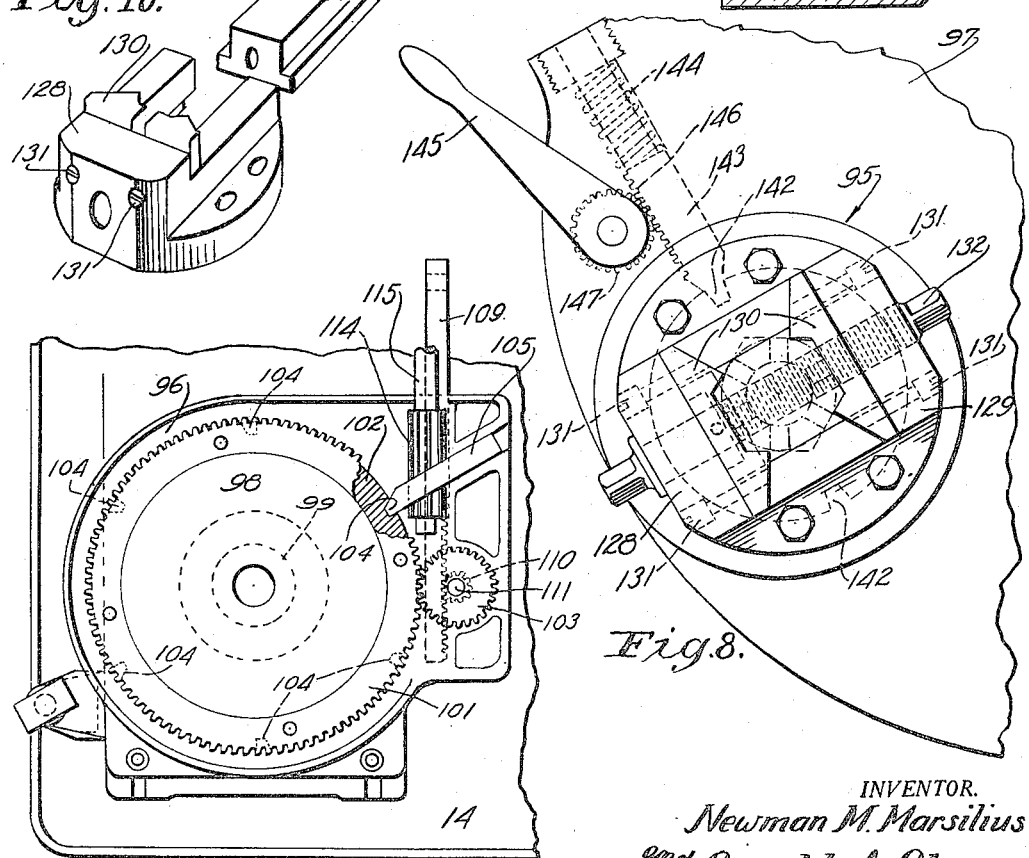

Patented May 31, 1932

1,860,840

UNITED STATES PATENT OFFICE

NEWMAN M. MARSILIUS AND OSWALD A. OLSEN, OF BRIDGEPORT, CONNECTICUT, ASSIGNORS, BY MESNE ASSIGNMENTS, TO THE PRODUCTO MACHINE COMPANY, OF BRIDGEPORT, CONNECTICUT, A CORPORATION OF CONNECTICUT

MILLING MACHINE

Application filed November 30, 1927. Serial No. 236,647.

The present invention relates to new and useful improvements in milling machines adapted for operating upon various articles.

One of the objects of our present invention is to generally improve on the machines shown in our applications serially numbered 75,276 Patent No. 1,689,635 and 192,002 Patent No. 1,756,831 filed December 14, 1925 and May 16, 1927, respectively. These machines are known as the "Pro-Ducto-Matic" and are designed for high speed production.

Since the machine is adapted for different turrets and fixtures it is capable of performing different kinds of milling operations, as for example, squaring, hexing, octagon, straddle-milling, slabbing, grooving, keywaying, cross-milling and the like.

A further object is to provide a machine of the type stated having certain improved features of construction whereby the machine lends itself to various alterations in a convenient manner so that it may be quickly adapted for operation on various parts. Economical construction and compact arrangement of parts are other features sought after. The machine also represents improvements in features such as the turret indexing and locking means and in the means for operating the work-holding chucks.

Additional objects and advantages will become apparent from a consideration of the following detailed description taken in connection with the accompanying drawings. However it is to be distinctly understood that the description and drawings are by way of illustration only and that changes in certain features of construction, combination and arrangement of parts may be resorted to without departing from the spirit of the invention or the scope of the accompanying claims to which reference must be had for a definition of the limitations of the invention.

Like reference characters denote like parts throughout the various figures of the drawings in which:—

Fig. 2 is an elevation of the same looking from the right in Fig. 1;

Fig. 3 is a perspective view of a castellated nut, this being one article on which the machine is adapted to operate;

Fig. 5 is an elevational view showing the means for reversing the direction of rotation of the cutters;

Fig. 6 is a vertical sectional view taken on the line 6—6 of Fig. 5;

Fig. 7 is a detail view showing the means for indexing and locking the turret, the view being taken along line 7—7 of Fig. 4;

Fig. 8 is an enlarged detail showing more clearly the locking means for the chuck or work-holder;

Fig. 9 is a detail sectional view on an enlarged scale showing the means for opening and closing the chuck;

Fig. 10 is a perspective view showing the chuck parts separated;

Fig. 12 is a detail view of the operating means for the turret locking bolt; and Fig. 13 is a plan view of the front portion of the machine, showing a modification.

Having detailed reference to the drawings, 14 indicates a base comprising a casting of suitable height having in its forward portion a chamber 15 receiving a basket or drawer 16 for catching chips. A table 17 is mounted on this base and together they serve to carry all the operative parts of the machine. A motor 18 arranged centrally of the base provides the necessary power for the operation of the machine and this power is distributed through suitable gearing arranged for the most part at the rear of the base.

Figure 4:
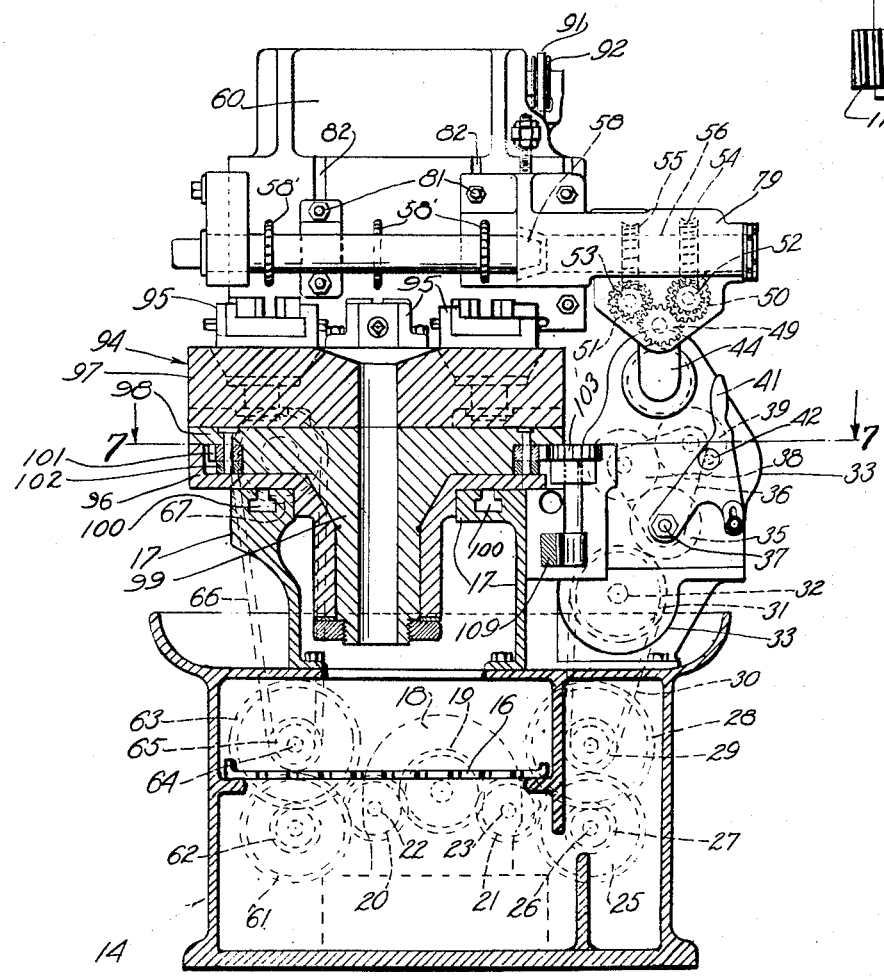
Fig. 4 is a sectional view taken along the line 4—4 of Fig. 1, looking in the direction of the arrows.

As is clearly shown in Figs. 2 and 4 the motor shaft carries a gear 19 meshing with and driving gears 20 and 21 arranged at opposite sides of the motor shaft on shafts 22 and 23 having suitable bearings in gear casing 24. Power from gear 20 through a suitable train of means is utilized to operate a cam shaft while the cutters are operated by power taken from the motor shaft by gear 21.

The drive for the cutters is from gear 21 through gear 25 on shaft 26 on which also is mounted a change gear 27 that drives an associated change gear 28 mounted on the same shaft with and driving a sprocket 29 which through chain 30 and sprocket 31 serves to drive shaft 32. This shaft as is clearly shown in Figs. 4, 5 and 6, is disposed within a gear casing 33 mounted on the base 14.

In addition to the sprocket 31 the shaft 32 carries a gear 34 meshing with and driving a gear 35 arranged within the upper portion of casing 33 which also contains gearing whereby the direction of rotation of the cutters may be reversed. To this end there is arranged within the casing brackets 36 secured for movement with shaft 37 and supporting stub shafts for gears 38 and 39. With the gears arranged as shown in Fig. 5, the drive is from gear 35 through gear 38 to gear 39 which meshes with and rotates a gear 40.

Arranged at the outside of casing 33 is an operating lever 41 mounted upon and adapted to move shaft 37, brackets 36 to swing gear 38 into driving relation with gear 40 and at the same time to remove gear 39 from such contact. For the purpose of holding the lever 41 in its new position a locking pin 42 is provided and is adapted to enter a notch in the casing as best shown in Fig. 6.

Gear 40 is mounted on and drives a shaft 43 connected to drive a tubular shaft 44 through a universal joint 45. This tubular shaft is slidably mounted upon a splined shaft 46 connected to a short shaft 47 by means of a second universal joint 48. Shaft 47 has a bearing in the cutter slide, later to be described, and carries a gear 49 meshing with and driving gears 50 and 51 mounted upon worm shafts carrying worms 52 and 53 which in turn drive worm gears 54 and 55 for driving shafts 56 and 57. A tapered socket is formed in the ends of these two shafts to receive correspondingly tapered ends 58 of the cutter shafts 56' and 57', the opposite end of said cutter shaft being journaled in brackets and each serve to carry one or more cutters 58', which as shown on this particular machine are alike in construction though obviously may vary according to the particular operations required.

The drive for the cam shaft 59 which indexes and locks the turret and operates the vertically reciprocatory cutter slide 60, is through gear 20 to a relatively larger gear 61 on the same shaft with change gear 62 that meshes with and drives a second change gear 63. Gear 63 is mounted upon a shaft 64 which in turn carries sprocket 65 and which through chain 66 and sprocket 67 drives a worm 68 that meshes with worm wheel 69 on cam shaft 59. A clutch 70 is interposed between sprocket 67 and worm 68 and is controllable through lever 71 on rod 72 and lock lever 73 provided for securing the rod 72 in its adjusted position.

The table 17 arranged on the base 15 carries an upright 74 that is adjustably mounted on the rear portion of this table 17, by means of T bolts 75 having their heads disposed in slots of the table. This upright includes reinforcing ribs 76 and the front of the upright is provided with a dove-tailed recess for slidably receiving ways of the cutter slide 60. Cam shaft 59 is mounted in bearings 77 on the rear portion of the table 17 and is held against longitudinal movement in said bearings by means of a collar 78.

A gear casing 79 as well as bearings 80 for shafts 56' and 57' are adjustably mounted on the cutter slide 60 by means of T bolts 81 operating in vertically disposed slots 82 in the face of the slide 60. Screw 83 carried by the slide also cooperates in providing for vertical adjustment of the slide. The universal joints and the sliding connection between the tubular and splined shafts provide for driving of the cutters in their various positions.

The rear of the cutter slide carries a rack 84 preferably formed of steel and secured thereto in a suitable manner. To provide for vertical reciprocation of the cutter slide during operation of the machine, a lever 85 carrying a toothed segment 86 is pivotally mounted as at 87 between the reinforcing ribs 76. The teeth of segment 86 engage the teeth of rack 84 and the rear end of lever 85 carries a roller engaging cam 88 secured to cam shaft 59 and acting to rock lever 85 on its pivot 87 to reciprocate the slide. A coil spring 89 anchored to table 17 as at 90 is secured to a flexible element 91 extending over a pulley or roller 92 on the frame, the other end of the element being connected to the slide as at 93. This spring tends normally to move the slide upwardly and thereby assists the operation of lever 85 and associated parts.

As clearly shown the turret 94 is mounted on the forward portion of the machine and in the illustration has six work-holders or chucks 95. The turret includes an annular hollow portion 96 in the nature of a housing and which is adjustably mounted on the table 17. A mounting plate 97, for the work holders 95, is carried by a rotatable table 98 having a central depending hollow spindle 99 bearing on the housing 96. Bolts, cooperating with slots 100 in table 17 provide for necessary adjustments of the turret longitudinally of the machine.

Secured to the rotatable table 98 are a pair of rings 101 and 102 the former of which is provided with gear teeth in engagement with a gear 103 adapted to be driven, as will be described, for rotating the turret to index the same. The ring 102 is provided with spaced notches 104 to be successively entered by bolt 105 for locking the turret against movement at each station during the milling operation. Here it may be stated that while six work holders and six notches 104 have been shown this number may be either increased or decreased as occasion requires depending upon the work to be performed.

Figure 1:
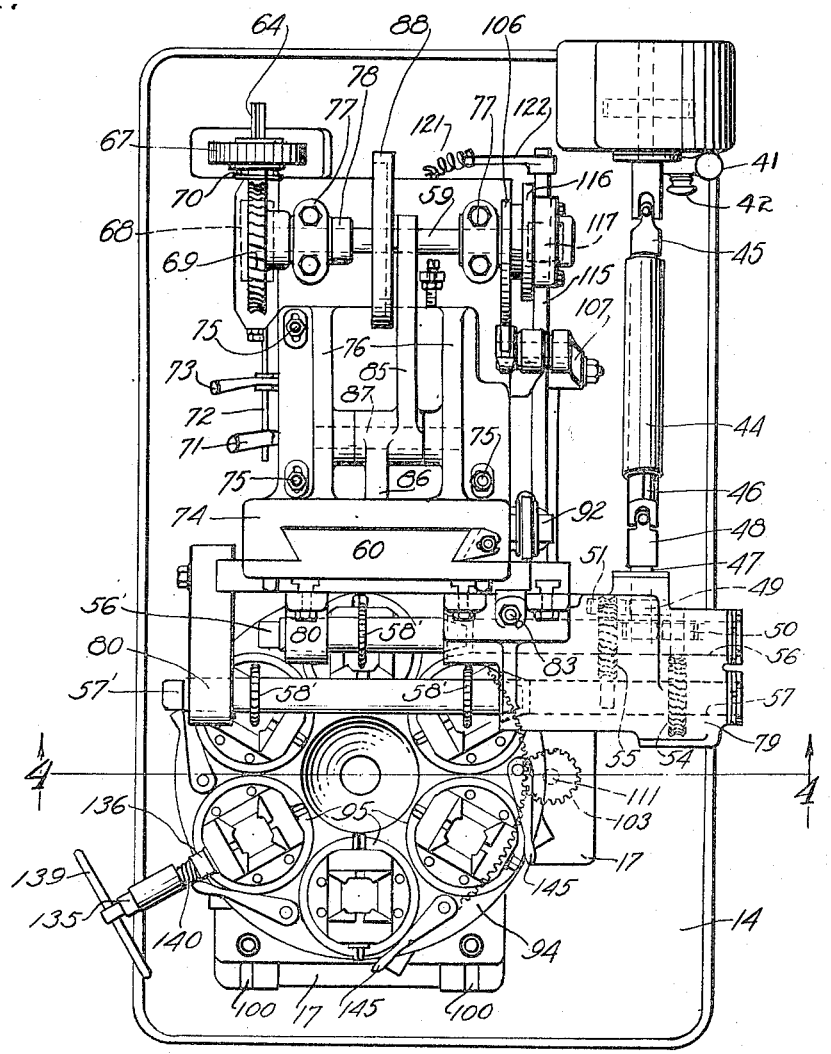
Fig. 1 is a plane view of our improved milling machine.
Figure 11:
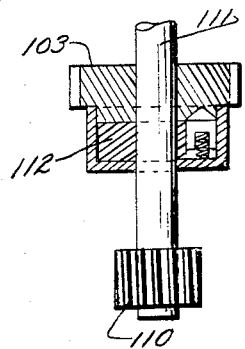
Fig. 11 is a detail view partly in section, showing a clutch arrangement forming part of the indexing mechanism.

Cam 106 on shaft 59 acts to rock a lever 107, pivotally mounted on bracket 108 carried by table 17, to reciprocate a rack bar 109, the teeth of which mesh with a gear 110 on the shaft 111 which also mounts gear 103 through means of a clutch 112, (see Fig. 11). This clutch transmits power to gear 103 only on the rearward stroke of rack bar 109, this being the motion imparted to said bar by the cam 106. A coil spring 113 imparts forward motion to the bar 109 and serves to maintain the upper roller carrying end of lever 107 in engagement with the cam 106. Lever 107 is connected to the threaded end of bar 109 whereby adjustment may be made for indexing a turret having more or less stations than that shown.

The under side of lock bolt 105 is toothed whereby it is reciprocated by a gear 114 on shaft 115 which is given a partial rotary movement by cam 116 operating on a gear 117, also carried by the shaft. Action of the cam is transmitted to gear 117 through roller 118, yieldingly mounted yoke 119 and rack bar 120, (see Fig. 12). A spring 121 operating on a lever 122, secured to shaft 115 serves to maintain roller 118 in engagement with cam 116 and to return the parts to their normal position and withdraw bolt 105 at the proper time to permit of further movement of the turret, i. e. to permit the turret to be moved to bring the work to the next station.

Work holders 95 are carried by the mounting plate 97. The work holders, (see Figs. 8, 9 and 10) each include a supporting means 123 comprising a disc 124 having its edge tapered to fit the conical bearing 125 in plate 97, and a stud 126 whose lower end is threaded to receive a nut 127 for securing the assembly. Carried by disc 124 are a pair of members 128 and 129 each carrying a removable jaw 130 secured by screws 131. These jaws are adapted to be replaced by other jaws to suit the task to be performed. A partially threaded rod 132 is rotatably mounted by member 128 and has threaded connection with member 129 whereby the rod may be rotated to move the jaws 130 toward or away from each other for clamping or releasing the work.

Since relative movement of the jaws need only be effected at the loading station, the operating means for rod 132 is located at that point. To this end a bracket 133 having a tubular portion 134 is arranged at the loading station. Mounted by portion 134 is a tool 135 including a socket 136, a shank 137 including a pivotal connection 138 and a cross bar 139 forming a hand piece. A coil spring 140 is disposed about the shank 137 at the pivot 138 to normally maintain the sections of the shank in alignment. A second coil spring 141 is arranged about the shank within the tubular portion 134 and maintains tool 135 in a retracted position. In operation, assuming the turret to be stationary it is but necessary to press forward on handle 139 to cause socket 136 to receive the suitably shaped end of rod 132 after which the jaws 130 are moved relatively by simply rotating the tool.

At diametrically opposite points the holders are each provided with notches 142 for receiving the nose of a bolt 143. While engaged with the notches the bolt of course prevents movement of the holder. As best shown in Fig. 8, the bolts 143 are urged into locking position by springs 144 and are adapted to be retracted by means of a lever 145 operating on a bolt carried rack 146, through a gear 147.

In Fig. 13 I have shown a slightly modified form of the invention adapted for operation on slightly different work. The machine shown in the other figures of the drawings is adapted for operation on a castellated nut 148 such as shown in Fig. 3. Assuming one of the holders to be loaded it will pass from the loading station to the first operating station. Here a kerf is cut in one side of the nut as at 149, the cutters being rotated to cut toward the center of the nut. At the second and third stations cuts are made as at 150 and 151. The job is now half finished and when the holder returns to the loading station the lever 145 is operated to withdraw the bolt 143 after which the holder is rotated one half turn whereby the other half of the nut will be presented to the cutters 57 during the next rotation of the turret.

The turret of the machine shown in Fig. 13 makes but one revolution before presenting the finished work at the loading station. This machine is shown as employed in milling the edges of nuts. Other than that cutters 58 are employed in pairs this machine does not differ from the one shown in the preceding figures. The nuts shown are hexagonal and two edges are milled at each operating station. Since three stations are shown it will be obvious that one revolution of the turret suffices for the finishing of the nut.

Having thus described our invention, what we claim and desire to secure by Letters Patent is:

1. In a milling machine, a bed having longitudinally extending slots therein, a turret forwardly on the bed, bolts carried by the turret and entering the slots whereby the turret may be adjusted on the bed a cam shaft rearwardly on the bed, an upright mounting frame on the bed intermediate the turret and cam shaft, a cutter carrying slide mounted in said upright frame for reciprocation, a cutter and cutter operating means on the turret side of said slide, an exposed rack on the cam shaft side of said slide, a lever, a toothed segment carried by said lever and in engagement with the rack, means pivoting said lever, and cam means on said cam shaft for moving said lever about its pivot to reciprocate the slide.

2. In a milling machine, a bed, a turret forwardly on the bed, a cam shaft rearwardly on the bed, a cutter slide on the bed intermediate the turret and cam shaft, cutter tools on the slide, means operated by a cam on the shaft for reciprocating the cutter slide, means operated by a cam on the shaft for indexing the turret, a motor, a gear train from the motor to the cam shaft, a clutch interposed in said gear train, a second gear train from the motor, said second gear train operating to drive the cutter tools on the slide, and means in the second gear train whereby the direction of rotation of the cutters may be reversed.

3. In a milling machine, a bed, a turret forwardly on the bed, a cam shaft rearwardly on the bed, a plurality of cams on the cam shaft, a cutter slide on the bed intermediate the turret and cam shaft, cutter tools on the slide, means operated by a cam on the shaft for reciprocating the cutter slide, means operated by a cam on the shaft for indexing the turret, a motor at the underside of said bed, a change speed gear train between the motor and the cam shaft whereby the motor drives the cam shaft, a clutch interposed in said gear train, a second gear train from the motor, said second gear train operating to drive the cutter tools on the slide, said second gear train including gears above and below the bed, said gears above the bed including a pair of gears mounted on a bracket, a casing enclosing said gears and bracket, means at the outer side of the casing for shifting the bracket and the pairs of gears carried thereon whereby to change the direction of rotation of the cutters, and means to secure said means in adjusted position.

4. In a milling machine, a bed, a cutter carrier on the bed, cutters on the carrier, means to drive the cutters, a turret on the bed in position to present work to the cutters, said turret including a housing member including a hollow portion extending through the bed, a table rotatably mounted on the housing member and including a portion having bearing in the hollow portion of the housing member, a mounting plate on the table and movable therewith, a chuck on the plate, a pair of rings on the periphery of the table, a gear meshing with the teeth on one of said rings, means for rotating the gear to index the table and plate, said other ring having spaced openings therein representing stations, and a bolt for entering said openings as they are presented for locking the turret during a milling operation.

5. In a milling machine, a bed, a cutter carrier on the bed, cutters on said carrier, means to drive the cutters, a turret on the bed in position to present work to the cutters, said turret including a housing member comprising a hollow portion extending through the bed, a table rotatably mounted on the housing member and including a portion having bearing in the hollow portion of the housing member, a mounting plate on the table and rotatable therewith, a chuck on the plate, a pair of rings on the periphery of the table, one of said rings having teeth and the other of said rings having spaced openings representing stations, a shaft adjacent said rings, a gear on said shaft and clutched thereto whereby movement of the shaft in one direction is imparted to the gear and movement of the shaft in the opposite direction is independent of the gear, said gear meshing with the teeth of said ring, a second gear on said shaft, a rod having teeth in engagement with the second gear, a cam on said shaft to move said rod in one direction to index the turret, a spring to move said rod in the opposite direction, a bolt to enter the openings in the other of said rings to lock the turret during a milling operation, and means to move said bolt to and from operative position.

6. In a milling machine, a bed, a cutter carrier on the bed, cutters on said carrier, means to drive the cutters, a turret on the bed in position to present work to the cutters, said turret including a housing member comprising a hollow portion extending through the bed, a table rotatably mounted on the housing member and including a portion having bearing in the hollow portion of the housing member, a mounting plate on the table and rotatable therewith, a chuck on the plate, a pair of rings on the periphery of the table, one of said rings having teeth and the other of said rings having spaced openings representing stations, a shaft adjacent said rings, a gear on said shaft and clutched thereto whereby movement of the shaft in one direction is imparted to the gear and movement of the shaft in the opposite direction is independent of the gear, said gear meshing with the teeth of said ring, a second gear on said shaft, a rod having teeth meshing with the teeth of the second gear, a cam to move said rod in one direction to index the turret, a spring to move said rod in the opposite direction, a bolt to enter the openings in the other of said rings to lock the turret during a milling operation, and means to move the bolt to and from operative position, said means including rack teeth on the bolt, a shaft, a pinion on the shaft and engaging said rack teeth, a second pinion on the shaft and spaced from the first pinion, a rack engaging said second pinion, a cam for moving said rack to rotate the shaft in one direction and move the bolt to lock the turret, and spring means to rotate the shaft in the opposite direction to move the bolt and release the turret.

Signed at Bridgeport, in the county of Fairfield and State of Connecticut this 28th day of November, A. D. 1927.

NEWMAN M. MARSILIUS.
OSWALD A. OLSEN.